(12) United States Patent
Deshpande (10) Patent No.: US 7,815,196 B2
(45) Date of Patent: Oct. 19, 2010

(54) MAGNETIC SEAL ASSEMBLY

(75) Inventor: Rajiv Deshpande, Maharashtra (IN)

(73) Assignee: Omega Kemix Pvt Ltd., Mumbai (IN)

( * ) Notice: Subject to any disclaimer, the term of this patent is extended or adjusted under 35 U.S.C. 154(b) by 439 days.

(21) Appl. No.: 11/995,294

(22) PCT Filed: Aug. 2, 2006

(86) PCT No.: PCT/IN2006/000280

§ 371 (c)(1),
(2), (4) Date: Jan. 10, 2008

(87) PCT Pub. No.: WO2007/052287

PCT Pub. Date: May 10, 2007

(65) Prior Publication Data

US 2009/0261531 A1 Oct. 22, 2009

(51) Int. Cl.
*F16J 15/00* (2006.01)

(52) U.S. Cl. ........................ 277/500; 277/410

(58) Field of Classification Search ............... 277/500, 277/410
See application file for complete search history.

(56) References Cited

U.S. PATENT DOCUMENTS

| | | | |
|---|---|---|---|
| 4,722,661 A | 2/1988 | Mizuno et al. | |
| 5,047,392 A * | 9/1991 | Hed | 505/165 |
| 5,137,286 A * | 8/1992 | Whitford | 277/410 |
| 5,263,829 A | 11/1993 | Gergets | |
| 2004/0223406 A1 | 11/2004 | Burak | |

FOREIGN PATENT DOCUMENTS

CN 1573210 2/2005

OTHER PUBLICATIONS

Chinese Office Action (with English translation) from the corresponding Chinese application No. CN200680028048.7, dated Jan. 8, 2010.

* cited by examiner

*Primary Examiner*—Vishal Patel
(74) *Attorney, Agent, or Firm*—Marshall, Gerstein & Borun LLP; Richard M. LaBarge (57) ABSTRACT

The technical field of the invention relates to magnetic sealing devices used for transfer of torque involving rotating parts. Industries that deal in chemicals and pharmaceutics have a requirement to mix materials such as gases and liquids. This is carried out by mixers and agitators and similar other equipment. All devices involve a shaft that comes out of the body of the equipment, that is to say it pierces the equipment. The location at which the shaft enters the equipment is a potential point of leakage. One of the technical problems that the present invention tackles is that of providing a secure sealing that will reduce leakage. The magnetic seal assembly disclosed in the present invention provides a magnetic sealing device that gives a safe, trouble-free, robust, and leak-proof contactless seal for agitator drives and similar equipment used for industrial scale applications. The device disclosed in the present invention is used for transferring torque in industrial scale agitators wherein large volumes of liquid can be treated without leakage.

5 Claims, 7 Drawing Sheets

MAGNETIC SEAL ASSEMBLY

FIELD OF INVENTION

The field of the invention generally relates to sealing devices used for transfer of torque involving rotating parts. The invention particularly relates to use of magnetic seals for this purpose.

DESCRIPTION OF PRIOR ART

Reference is made to the patent application No. 926/MUM/2005, wherein a provisional specification is submitted on 9 Aug. 2005, and the complete specification (now converted to a provisional specification), submitted on 11 Oct. 2005.

Industries that deal in chemicals and pharmaceutics have a requirement to mix materials such as gases and liquids. This is carried out by mixers and agitators and similar other equipment. Several chemical and process machinery such as reactors, blowers, turbines, pumps, agitated filters, etc., have an internal impeller attached to a shaft. The shaft-impeller assembly is rotated with a prime mover (D) (motor with/without gearbox). The shaft comes out of the body of the equipment, that is to say it pierces the equipment. The location at which the shaft enters the equipment is a potential point of leakage. Several attempts have been made in the past to provide secure sealing that will reduce leakage.

Conventionally, the shaft ingress point is sealed in a somewhat crude manner, either by a stuffing box, or a mechanical seal.

A stuffing box is a cylinder concentric to the shaft, attached to the vessel. Packing materials such as asbestos, graphite or PTFE ropes are "stuffed" into the annular space between the shaft and the concentric cylinder. (Ropes can also be of other suitable materials.) The packing is tightened with another hollow cylinder, whose inner diameter is slightly larger than the shaft, and whose outer diameter is slightly less than the concentric cylinder. There is usually continuous leakage through the stuffing box, and this sealing method can only be used for reactors of non-hazardous liquids at atmospheric or low pressures. Considerable power can be lost in friction at the stuffing box. At medium to high speeds, the tightened rope can eat into the shaft, causing a reduction in shaft diameter.

A mechanical seal is a chamber at the shaft ingress point. This chamber is filled with oil and is externally pressurized to a pressure slightly higher than the vessel operating pressure. A rotating disc (seal face) is attached to the shaft, and the chamber contains a stationary disc (seal face). The faces press against each other with the help of springs, which push the seal faces against each other. An oil film forms between these faces, which rotate with respect to each other. The oil film prevents leakage of process fluid (usually gases) from escaping through the seal. Usually, one of the seal faces is of hard material such as Silicon Carbide, Tungsten Carbide, or Stellite, while the other face is of soft material such as carbon. For sealing reactors at higher pressures, the, seal chamber may have an additional set of seal faces to prevent leakage of the sealing fluid in the chamber to the atmosphere.

Mechanical seals are commonly available, in a wide variety of designs. Mechanical seals have barrier fluids that can leak in case of seal failures. Mechanical seals can fail in several ways. The most common cause is failure of seal elastomers caused by mechanical damage to the faces, mechanical shock, improper alignment, vibration, etc. leading to leakage across the seal face. In these cases, there is loss of vessel fluids, and/or contamination of vessel contents with seal liquids. Mechanical seals are used in equipment where service is too severe to permit use of stuffing boxes. Pressures and temperatures are higher, and generally, process fluids are more hazardous. Due to this reason, mechanical seal failure can seriously compromise plant safety, and can also result in environmental hazards.

A third type of sealing arrangement is a magnetic seal, also known in the art relevant to the present invention as Mag Drive, which is used in some centrifugal pumps. This consists of an external magnet assembly, rotated by a motor. An internal magnet assembly is located inside the pump casing, and the pump shaft/impeller is attached to the internal magnets. When the external magnets rotate (with the help of motor), the pump impeller rotates and pumps fluid.

Use of magnetic seals pumps is relatively easy. Pump shafts are short, and are supported at either end with ceramic sleeve bearings, which are cooled by the liquid being pumped. Also, pumps generally consume low power, as they have small size impellers. Due to their high speeds, typically 3000 RPM, torque requirements are low. (For a given horsepower, torque is inversely proportional to RPM).

Hitherto, there has been considerable difficulty in using magnetic seals for agitator and similar drives, for the following reasons. Power consumption is relatively high, and speeds are low, usually below 300 RPM, hence torque requirements are substantially higher in Reactors.

Scherer in the U.S. Pat. No. 5,692,957 discloses a magnetic coupling system that has driving and driven coupling elements. The magnetic coupling system disclosed therein includes a sleeve bearing apparatus comprising a pair of axially spaced sleeve bearings. A drawback of this invention is that the sleeve bearings are prone to freezing at low temperatures, thereby necessitating circulation of heating fluids around the sleeves. Another drawback is that there is considerable heat generated by friction in the operation of the invention.

Another feature of the currently used magnetic seals is that they use sleeve bearings at two ends of the shaft. Unlike in case of pumps, it is not advisable to have bearings at either end of the shaft, in case of equipment handling corrosive fluids. The end of the agitator shaft which is immersed in process liquid, which may be corrosive, and can also have suspended abrasive solids, can erode an immersed bearing or the shaft itself. It would therefore be advantageous to have a shaft that suspends inside the agitator with the help of a cantilever support.

There are some other limitations on the currently available magnetic seals for reactors. One limitation is regarding the size of the reactors. The currently available magnetically sealed reactors are used for laboratory scale applications where the mixing volumes are up to 1 to 40 liters and where torque requirements are relatively low (a maximum of approximately 250 Nm). Another limitation is regarding the shaft diameter. The currently available magnetic seals cater for shaft diameters of up to approximately 4cm. The limitations on the shaft diameter and the mixing volume also mean that the currently available magnetic seals cannot be deployed on industrial scale applications where the mixing volumes can be 2 cubic meters to 25 cubic meters or up and torque requirements can be as high as 2000 Nm or more. As a consequence, the currently available magnetic seals find use in some pumps and laboratory scale reactors (autoclaves). A look into the workings of currently available magnetically sealed pumps and laboratory reactors will help to understand the reasons behind these limitations:

a) Centrifugal pumps operate at high speeds, typically around 3000 RPM. (For a given horsepower, torque is inversely proportional to RPM). Hence, a medium size (10 HP)

centrifugal pump will have a steady-state torque rating of 24 Newton-meters (N-m). As torques are low, shaft sizes as well as magnet assemblies are correspondingly small. Hence, the outer magnet assembly is quite small, of the order of 10 cm diameter and 8 cm long. Such small assemblies can be directly mounted on motor shafts, without any fear of eccentric motion (wobbling). The inner pump assembly is an impeller attached to a shaft, fitted with inner magnets. The shaft is supported at either end into ceramic sleeves fitted in the pump casing. These sleeves act as bearings, and keep the pump shaft/impeller/inner magnet assembly aligned in the pump casing. The pump is always operated in "primed" condition, i.e., when it is flooded with the liquid to be pumped. This fluid removes frictional heat generated in the sleeve bearings, and keeps them cool.

b) Lab scale reactors are fitted with fractional HP motors (less than 1 HP), and typically operate at 500 to 1000 RPM. The maximum torque for such reactors is 10 to 15 N-m. Shaft sizes are small, say 1 to 2 cm diameter. Equipment for such low torques require miniscule magnetic drives. As in the case of centrifugal pumps, the outer magnet assembly is coupled to the motor shaft. Its small size and low weight precludes any chances of wobbling. The Shaft, which hangs at the top, is very light, about a few grams. As a result, axial and radial loads are extremely low, hence, the shaft is supported (prevented from falling into the lab reactor) by means of ceramic or elastomeric bushes at its upper end.

On the other hand, magnetic seals for Industrial Reactors/Autoclaves require substantially higher torque. Motor HP ranges from 1 to 50, and agitator speed from 30 to 300 RPM. Magnetic torques range from 80 N-m to well over 1000 N-m. Hence, shaft diameters and lengths are high; say 4 to 30 cm diameter, and 1 to 4 meters long. Some shafts can be even larger and heavier, with weights exceeding 1 Ton. Lab reactor shafts weigh a few grams. Pump impeller assemblies weigh a few kg., and are not subjected to any axial loading. Higher torques require substantially higher inner and outer magnet assemblies, and obviously larger shrouds. Hence, design of magnetic seals for industrial reactors/autoclaves/agitators needs to address these issues. It is not possible to scale up existing designs in a linear manner, for the following reasons:

1) Magnetic seals in Industrial reactors are likely to be used to contain hazardous vapours/gases, or withstand high internal pressures, or prevent contamination of reactor contents, or a combination of these. As shroud diameters are higher, shroud thicknesses will be correspondingly high. (To withstand a given pressure, a larger diameter shroud has a higher wall thickness.). This means that inner and outer magnets will be further away from each other, and hence will exert less magnetic force. This, in turn, makes it necessary to provide larger/more magnet assemblies, requiring even larger shrouds.

2) Inner bearings cannot be sleeves (like ceramic/elastomer sleeves for lab reactors/pumps), as sleeves cannot bear high weight of inner shafts. These bearings need to be made from rolling elements, such as ball or roller bearings. Also, inner bearings cannot be at either ends of the shaft, as, at the lower end, the shaft/impeller is immersed in the reactor liquid being mixed. Of necessity, inner bearings need to be located in the upper portion or headspace of the reactor, and the rotating shaft will exert cantilever loads on the bearings, due to radial thrust on the impeller. Further, some impellers (also known as down pumping impellers) pump reactant liquids downwards. This results in an upward thrust on the shaft. Inner bearings have to resist these axial and lateral loads.

3) Chemical reactors are used for mixing/reacting a variety of fluids, many of which are corrosive to a greater or lesser extent. All parts of inner bearings need to be of corrosion resistant materials such as stainless steel or ceramic.

4) Chemical Reactors often contain solvent vapours, which can dissolve bearing greases. These solvents can also attack lubricants, even in "sealed" bearings. Also, many chemical reactors are subjected to vacuum. This can force grease to ooze out of bearings. Hence, it is often necessary to use non-lubricated bearings. It may be noted that the load-carrying capacity of a non-lubricated bearing is a fraction of that of an identical lubricated bearing. This also needs to be factored into design of magnetic seals for industrial equipment.

5) Outer magnet assemblies for industrial reactors are much larger than those used in lab equipment or pumps. To maintain their concentricity with the static shroud, (i.e., to prevent wobbling), the outer magnet holder is provided with bearings at either end. These outer bearings will also need a housing (stool), and need to be immersed in lubricant. This lubricant needs to be cooled, hence, the stool is jacketed, and coolant circulated through the jacket. The stool also serves as a base to mount the prime mover (motor).

6) Chemical reactors can contain suspended solids, some of which can get fluidized (airborne) in the vapour headspace. Anti-dust bushes above and below upper and lower inner bearings prevent this dust from entering and "seizing" the inner bearings. This phenomenon is absent in lab reactors & pumps, where the sleeve bearings prevent ingress of solids.

7) Internal pressure or vacuum can result in severe axial loads on reactor shafts. For example, internal pressure of 25 atmospheres on a 10 cm diameter shaft can result in upward bearing load of almost 2 tons. The anti-dust bushes need to be permeable to vapours, to avoid buildup of such loads.

8) Reactors can contain hazardous fluids. In case of leakage in the static shroud, the stool is fitted with a leak detection port. This port can be connected to a vent line, through a chamber fitted with suitable sensors to register leakages.

It is not possible to scale up existing (small sized) magnetic seal designs in a straightforward manner. For these reasons, magnetically sealed agitators have not been widely used till now, particularly in the corrosive and abrasive environments or high pressure applications, especially on industrial scales. There is therefore a need for a magnetic seal assembly that successfully addresses these issues, and gives a safe, trouble-free, robust and leak-proof contact-less seal for agitator drives and similar equipment for industrial scale applications.

OBJECTS OF THE INVENTION

Accordingly an object of the present invention is to provide a magnetic seal assembly that is deployable in industrial scale applications and that provides very low or near-zero leakage.

Another object of the present invention is to provide a magnetic seal assembly that:

a) Leaves little or no wear and tear on shaft.
b) Saves power through minimizing friction between moving parts.
c) Eliminates necessity of using sealing fluids that could potentially leak, into the reactor in case of the failure of the seal-face.

d) Provides a non-contact method of sealing, resulting in long life and trouble-free operation.
e) Ensures safe sealing of vessel fluids at high pressures and temperatures.
f) Ensures safe sealing in case of applications requiring use of corrosive gases such as Chlorine, Bromine etc.
g) Ensures safe sealing of hazardous, toxic or flammable fluids.
h) Provides a shaft that suspends inside the agitator by a cantilever arrangement.
i) Can be used on industrial scale where mixing volumes are large which require large torque and where the shaft diameters can be suitably high.

LIST OF REFERENCE NUMERALS

Vessel Nozzle flange (A)
Vessel or reactor (B)
Gasket (C)
Prime mover (D)
Mounting flange (1)
Static shroud (2)
Lower stool flange (LSF) (3)
Bearing housing (4)
Bearing lock (5)
Bolts for bearing lock (6)
Driver coupling bolts (8)
Jacket Inlet connection (10a)
Jacket Outlet connection (10b)
Angled holes (11)
Shroud shell (12)
Shroud flange (13)
Shroud cap (14)
Shroud bolts (15)
Inner O-ring (16)
Outer magnet holder (17)
Outer magnets (18)
Outer lock nut (23)
Outer lock washer (24)
Lower outer bearing (26)
Stool shell (27)
Upper stool flange (USF) (28)
Stool jacket (29)
Inner magnet holder (30)
Inner magnets (31)
Inner sleeve (32)
Inner core (33)
Inner shaft with coupling (34)
Upper inner bearing (35)
Lower inner bearing (36)
Inner lock nut (37)
Inner lock washer (38)
Lower Anti-Dust bush (40)
Outer O-ring (41)
Oil reservoir (42)
Inner washer (43)
Inner shaft lock bolt (44)
Driven Shaft (45)
Central Hole (46)
Upper Anti-Dust Bush (47)
Leak Detection Port (48)
Oil Drain Valve (49)
Oil Overflow Valve (50)
Upper outer washer (UOW) (20)
Driver coupling (21)
Upper outer bearing (22)
Lower outer washer (LOW) (19)

SUMMARY OF INVENTION

The magnetic seal assembly (MSA) disclosed in the present invention comprises a sealed chamber having a rotating shaft/impeller inside. An inner magnetic assembly is attached to the rotating shaft. Outside the sealed chamber, an outer magnet assembly is rotated by means of a prime mover (D). Magnetic flux is transmitted from the outer magnet assembly to the inner magnet assembly through walls of the chamber, thus transmitting contact-free torque, which rotates the inner shaft/impeller. The MSA is also fitted with devices to align the inner/outer magnets and shaft, hold these in position during rest position or while rotating. It is also fitted with sealing devices to prevent solids or dust from depositing on inner magnet surfaces inside the shroud or to prevent contents of the sealed chamber to escape to the external environment.

DETAIL DESCRIPTION OF THE PRESENT INVENTION

FIGS. 1 through 8 illustrate the invention in detail. The explanatory drawings are shown in isometric views or isometric half-sections wherever appropriate. A cross-sectional drawing is shown alongside each isometric view.

Figure 1:
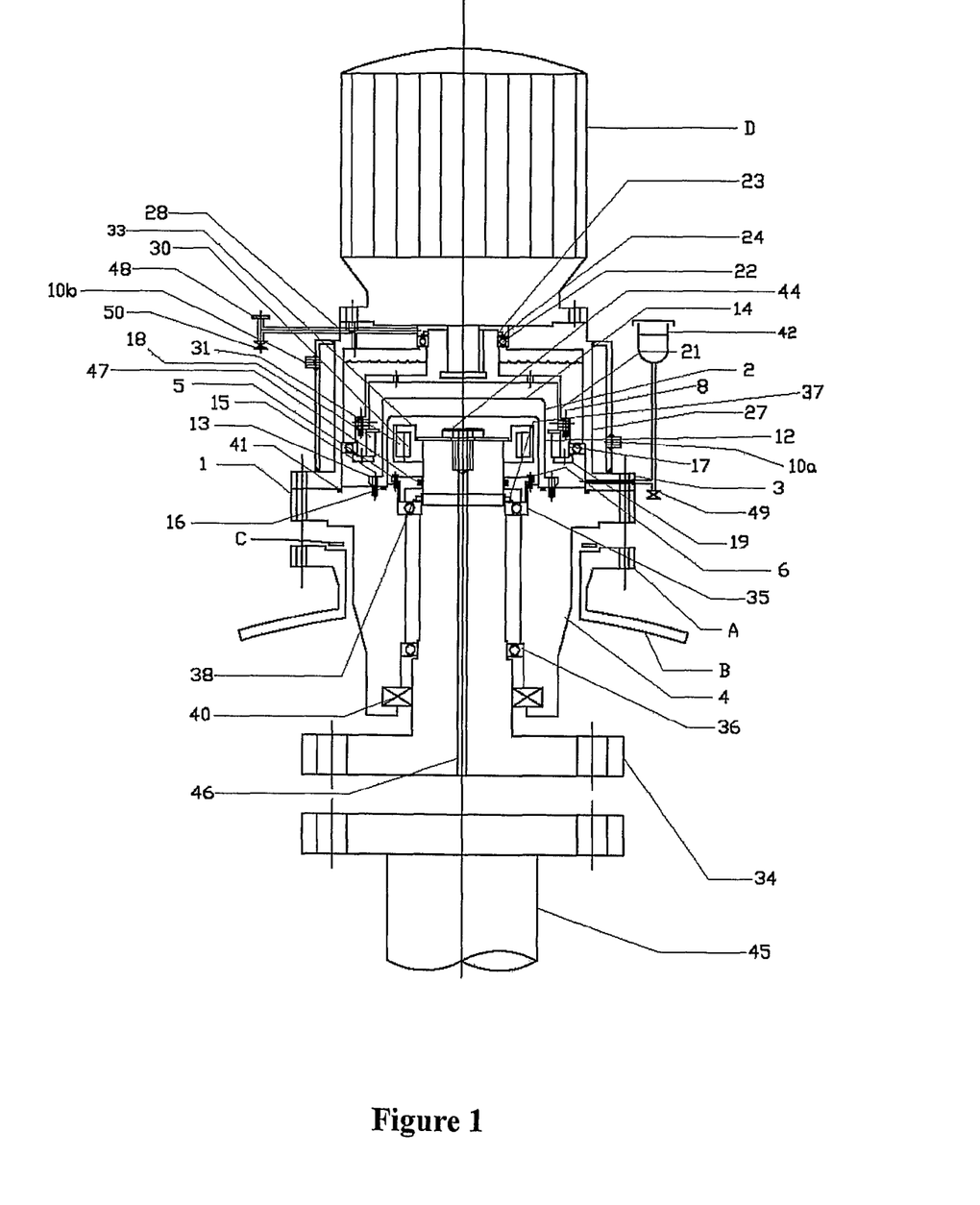
FIG. 1 schematically shows the magnetic seal assembly of the invention in cross section.

As shown in FIG. 1, the magnetic seal assembly of the present invention comprises an annular mounting flange (1) that is bolted onto a nozzle flange (A) on the vessel/reactor (B). A gasket (C) between the nozzle flange (A) of the vessel (B) and the mounting flange (1) ensures sealing of the assembly against vessel pressure.

The upper surface of the mounting flange (1) has two grooves for fitment of O-rings, namely the inner O-ring (16) and the outer O-ring (41), both of which are normally made from elastomeric materials, and which will provide a seal between the static shroud (2) and the lower stool flange (3). Steps are provided on the upper face of the mounting flange (1) to help locate and relatively position the static shroud (2) and lower stool flange (3). The inside bore in the mounting flange (1) is fitted with a hollow cylinder, which serves as a bearing housing (4). Inner bearings [comprising upper inner bearing (35) and lower inner bearing (36)] are fitted at either end of the bearing housing (4).

Upper and lower inner bearings (35 & 36 respectively) are exposed to fluids from the vessel (B), which can be corrosive, and/or high in temperature. In many cases, these fluids can dissolve normal bearing lubricants. Hence, inner bearings are made from inert materials, and are either self-lubricated, or non-lubricated (dry running), or are sealed with inert lubricants.

Figure 2:
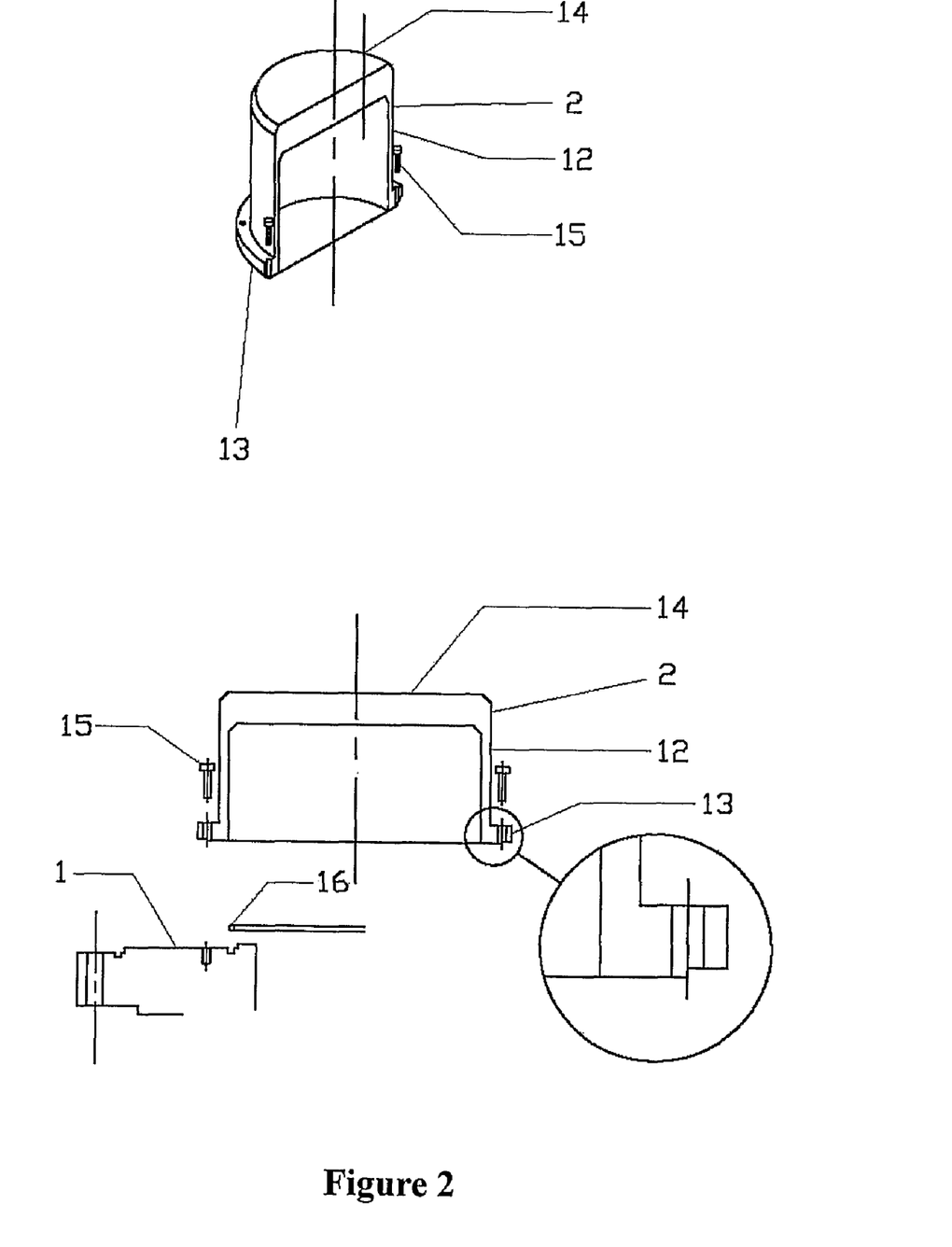
FIG. 2 shows shroud with cover flange and O-ring.

As shown in FIG. 2, the static shroud (2) provides the basic pressure containment of the MSA. It comprises a shroud shell (12) that normally is cylindrical, with a shroud flange (13) at its lower end, and a shroud cap (14) at its upper end. The shroud flange (13) has drilled bolt holes. A plurality of shroud bolts (15) placed in these holes fix the static shroud (2) to the mounting flange (1). A leak proof sealing between the static shroud (2) and the mounting flange (1) is achieved by means of the inner O-ring (16), which fits into the inner O-ring-groove of the mounting flange (1). The shroud flange (13) has a step at its lower (gasket) face at its bolt-circle diameter (BCD). This serves to reduce the bearing area acting on the inner O-ring (16) leading to increased pressure on the inner O-ring (16) and helps compress it in a uniform manner, thereby leading to a good seal.

Figure 3:
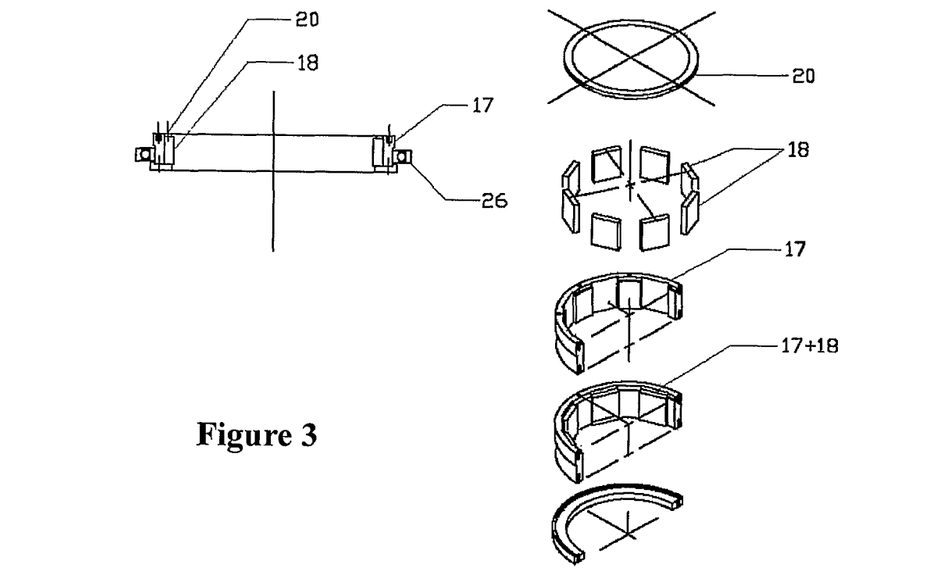
FIG. 3 shows outer magnet assembly.

As shown in FIG. 3, the outer magnet assembly comprises the outer magnet holder (OMH) (17), outer magnets (18), and outer upper/lower washers. The OMH (17) is a hollow cylinder made out of soft iron or other such suitable material, with axial slots machined into its inner cylindrical surface. These axial slots are fitted with outer magnets (18) that are normally rectangular in shape, and which have their north-south poles along their faces, i.e., they are magnetized along their thickness, and not along their length. Outer magnets (18) attach themselves to the OMH (17) by magnetic attraction, and as further safety, can be fixed into the axial slots with special adhesives. A lower outer bearing (LOB) (26) is fitted on the outer cylindrical surface of the OMH. Outer races of the LOB (26) are fitted into a suitable recess in the stool shell (27).

The OMH (17) has tapped holes at its lower end. A lower outer washer (LOW) (19) is fitted to the lower end of the outer magnet holder (17) with screws, which are screwed into these tapped holes. At its upper end, inner cylindrical portion of the outer magnet holder (17) is fitted with an upper outer washer (UOW) (20). As the outer magnets (18) are located between LOW (19) and UOW (20), this serves to restrict any axial movement of the magnets. As an advantageous feature of the present invention, the LOW (19) also prevents the LOB (26) from slipping down while rotating. The OMH (17) also has tapped holes on its upper surface, where a driver coupling (DC) (21) (as shown in FIG. 4) is bolted or screwed on.

Figure 4:
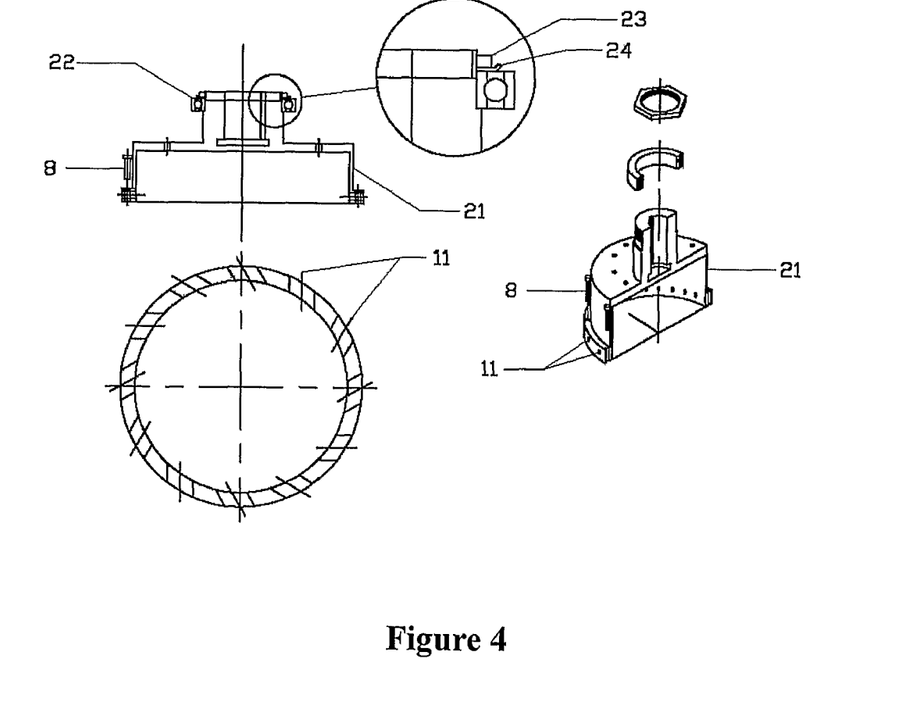
FIG. 4 shows the driver coupling with outer upper bearing.

Referring to FIGS. 3 and 4, the outer magnet assembly is coupled to the prime mover (D) by a DC (21) which is bolted, with driver coupling bolts (8), to the upper part of the OMH (17). The DC (21) has angled holes (11) that radially fan outwards. These holes are oriented tangentially outwards, and serve to act as centrifugal pump vanes, throwing out the lubricant or the coolant (including normally appropriate oils) surrounding the static shroud (2). Rotating inner and outer magnets (18) give rise to eddy currents in the static shroud (2). These currents, in turn, generate heat. The skewed orientation of the angled holes will, during the rotation of the assembly, advantageously flow the lubricant/coolant up the cylindrical surface of the shroud. This helps remove the heat thereby cooling the static shroud (2). Oil circulation also serves to keep magnets cool. As an advantageous feature of the present invention, the DC (21) has vent holes on its upper surface to ensure that coolant completely fills it.

Coolant oil (hereafter referred to as oil) is filled in the stool assembly through the oil reservoir (42). The outer magnet assembly as well as outer surface of the shroud are immersed in this oil. Oil is filled till it overflows out of the oil overflow valve (50), which is then closed. Before disassembly, oil is drained out through the oil drain valve (49), located at the outer diameter of the stool flange (28) or mounting flange (1). Oil in the stool cools the outer bearings and also dissipates the heat generated in the shroud due to eddy current losses in the shroud. (When torque is magnetically transmitted across an electrically conducting medium such as the stainless steel/hastelloy shroud, eddy currents are generated in the shroud. These currents heat up the shroud.)

As shown in FIGS. 2 to 4, the upper end of the DC (21), which is machined inside and outside, and is fitted with an upper outer bearing (22), locates relatively the outer magnet assembly and DC (21). The Upper and lower outer bearings (22 & 26 respectively) align the outer magnet assembly coaxially to the static shroud (2). The outer bearings (22 & 26) ensure that the outer magnet assembly is concentric to the Shroud, and that there is a uniform gap between the outer magnets (18) and the Shroud. These outer bearings enable use of several rows of magnets, which are instrumental in achieving higher torques. If required, more than two outer bearings can be incorporated, depending upon length of magnets and number of rows of magnets. The corresponding inner part of the DC (21) is bored to accommodate a prime mover shaft with keyway. The machined upper end of DC (21) is partly threaded to fit an outer lock nut (23) and an outer lock washer (24), which locks the upper outer bearing (22) in place.

Figure 5:
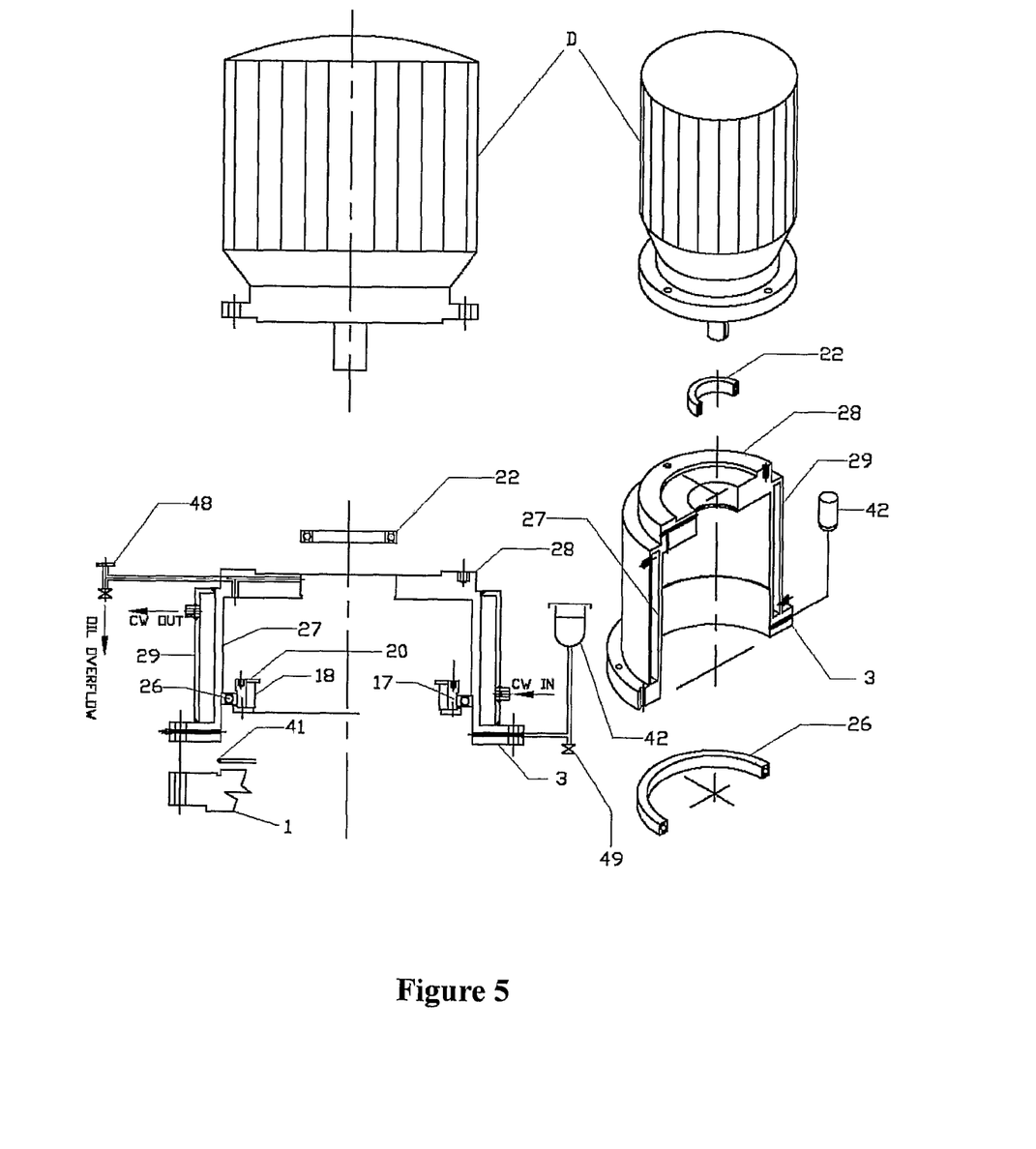
FIG. 5 shows stool assembly along with motor, stool bearings, outer -magnet assembly, a leak detection port, and mounting flange with O-rings.

The outer magnet assembly and DC (21) are located inside the stool assembly. As shown in FIG. 5, the stool assembly has connections for lubricant or coolant filling, and overflow and draining thereof. The stool assembly comprises a lower stool flange (LSF) (3), a stool shell (27) fitted at either end, an upper stool flange (USF) (28), and an optional stool jacket (29). The LSF (3) sits on the mounting flange (1), and is located by a step in the mounting flange (1). The LSF (3) is bolted to the mounting flange (1), with a gasket or outer O-Ring (41) ensuring leak proof sealing between the LSF (3) and the mounting flange (1).

The stool shell (27) is filled with lubricating fluid, which lubricates the lower outer bearing (26), and which also acts as a coolant. The lower stool flange (3) has a connection for filling lubricant that is supplied from an oil reservoir (42). The outer magnet assembly is also immersed in this lubricant/coolant. A stool jacket (29) surrounds the stool shell (27). Cooling water or any other suitable coolant is circulated through the stool jacket (29), which has inlet and outlet connections (10a & 10b, respectively, as shown in FIG. 1) at its, lower and upper ends, respectively.

The USF (28) has a recess and tapped holes in its upper face to accommodate a flange mounted prime mover (motor or gearbox, D). The inner diameter of the upper stool flange (28) is machined to accommodate an upper outer bearing (22). The outer races of this bearing fit into the USF (28). As shown in FIGS. 2 and 4, inner races of the bearing sit on a suitably machined part at the upper end of the DC (21). As an advantageous feature of the present invention, this is the way in which the driver coupling (21), and consequently, the outer magnet assembly, is located coaxially-to the static shroud (2).

Figure 6:
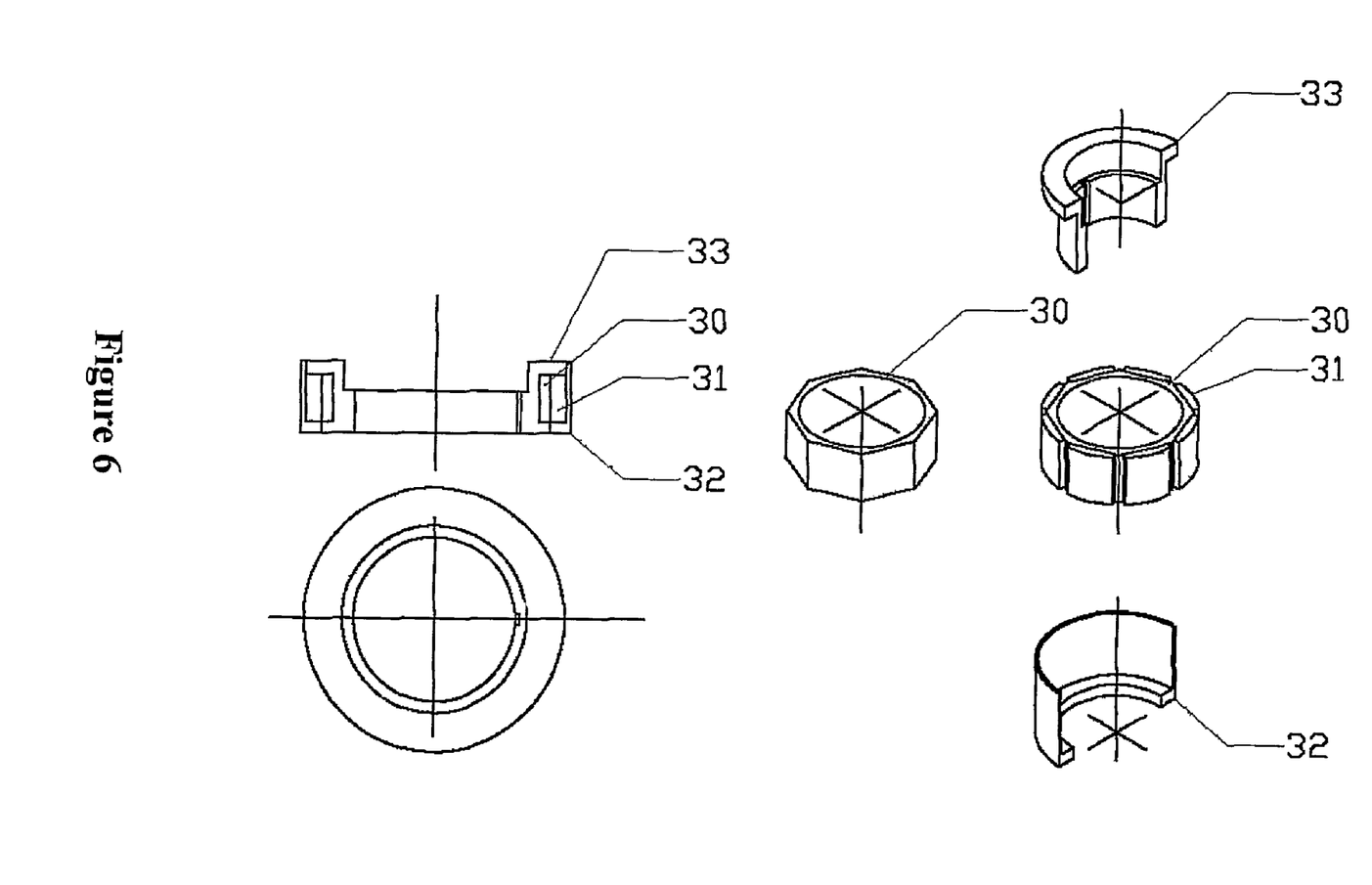
FIG. 6 shows inner magnet assembly.

As shown in FIG. 6, the inner magnet assembly comprises the inner magnet holder (30), inner magnets (31), inner sleeve (32), and an inner core (33). The inner magnet holder (30) is a hollow soft-iron cylinder. Outer surface of this cylinder is machined into a polygonal surface, where the number of sides in the polygon equals the number of inner magnets in the assembly. Each of the inner magnets (31) is attached to a corresponding side of the polygon.

Figure 7:
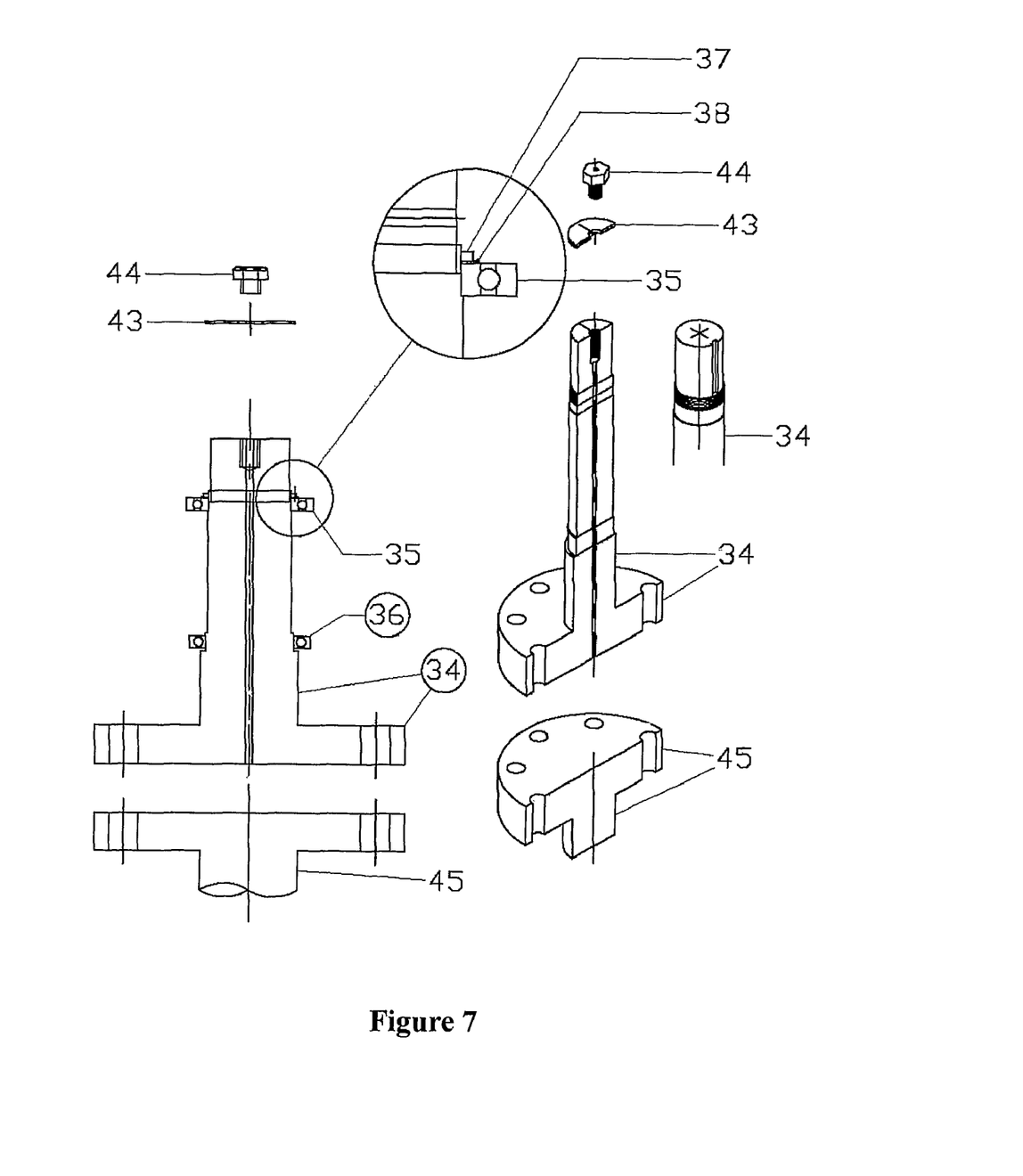
FIG. 7 shows inner shaft with inner washer with lock bolt, inner bearings, inner lock nut and lock washer, along with driven shaft.

Referring to FIGS. 6 and 7, the inner magnet holder (30) is welded onto a non-magnetic inner core (33). The inner core (33) is a stepped hollow non-magnetic cylindrical part, the step being provided to facilitate secure positioning of the inner washer (43). The inner magnet holder (30) with attached inner magnets (31) slides onto the inner core (33). The inner sleeve (32) which is made of corrosion resistant material fits over the inner magnets (31), and is welded to the inner core (33) at either end. This ensures that the inner magnets are not in contact with fluid, which can be corrosive in some cases, in the reactor vessel (B).

As shown in FIGS. 6 and 7, the inner core (33) has a stepped hole at its axis to accommodate the inner shaft with coupling (34). The diameter at the upper end of the stepped hole is greater than the diameter at its lower end. The lower (smaller diameter) hole is slotted to fit a keyway, which ensures that the inner shaft with coupling (34) rotates along with the inner core (33).

FIGS. 6 and 7 show the inner shaft with coupling (34) that passes through a central bore in the inner core (33), as described above. The upper end of this shaft has a tapped hole. An inner washer (43) placed on the step of the inner core holes has an inner shaft lock bolt (44), which is tightened into the tapped hole in the inner shaft with coupling (34), thus axially locating the inner shaft with coupling (34) with respect to the inner core (33). The inner shaft has a threaded portion in and above the upper inner bearing (35), to accommodate an inner lock nut (37) and an inner lock washer (38), which serves to hold down the upper inner bearing (35).

Figure 8:
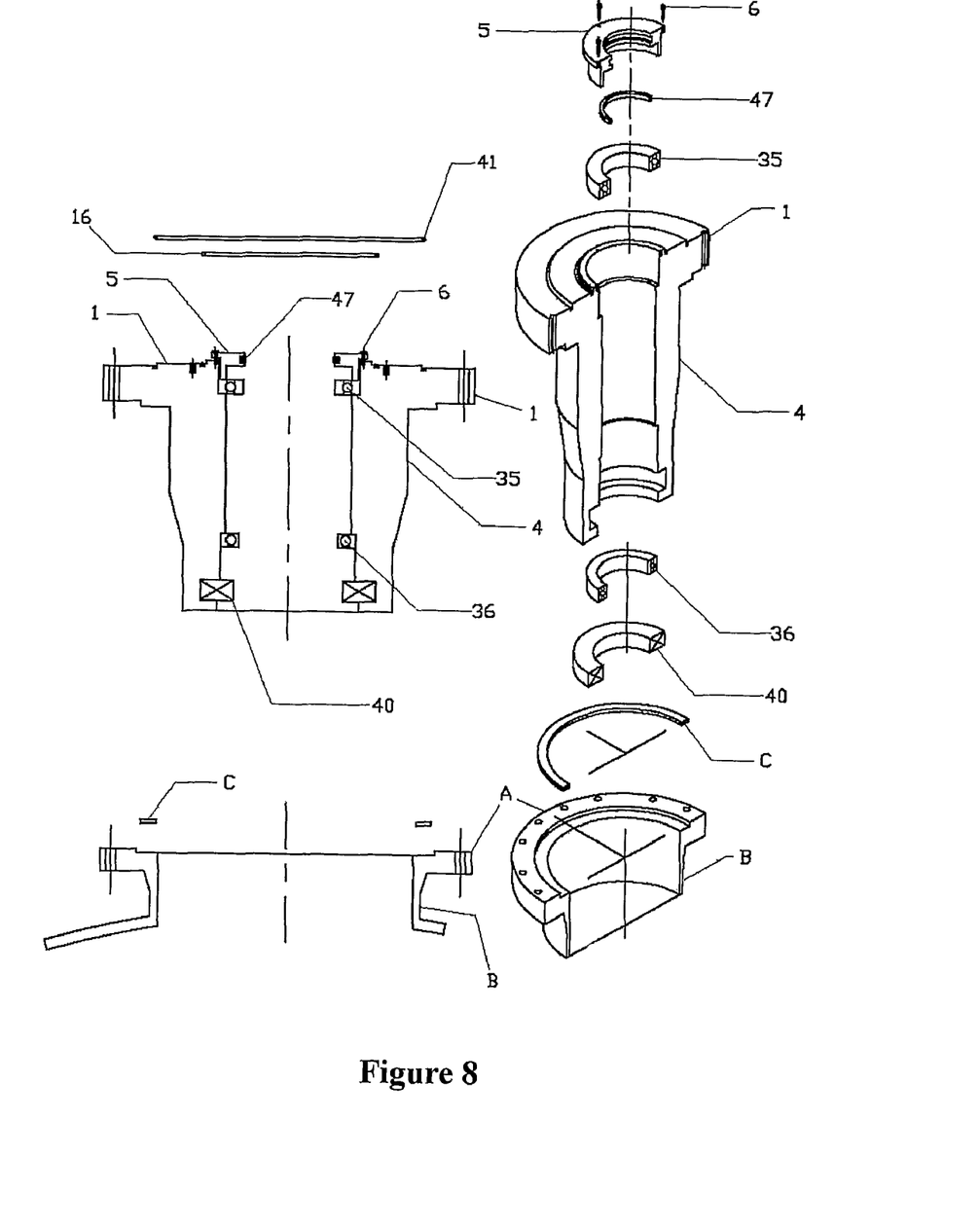
FIG. 8 shows bearing assembly with inner bearings, anti-dust bush, and vessel with nozzle flange and gasket.

Referring to FIGS. 7 and 8, the upper inner bearing (35) is capable of withstanding axial loads due to weight of the shaft, as well as axial hydraulic forces generated by the pumping action of the agitator shaft. The upper inner bearing (35) is held down by a bolted bearing lock (5), so that any upward thrust on the agitator shaft will not lift the magnetic drive assembly. The bearing lock (5) is bolted to the mounting flange (1) by bolts (6).

As shown in FIG. 8, the bearing housing (4) is extended so that a lower anti-dust bush (40) is fitted between the inner shaft and the bearing housing. The lower anti-dust bush (40) is a hollow cylinder made of graphite, PTFE, PEEK, or other suitable material, to prevent dust or solid particles from entering the area of inner bearings or shroud. It also serves as a barrier for hot vessel vapors from coming into direct contact with inner bearings and inner magnets. Similarly, an Upper Anti-Dust Bush (47) is fitted at the upper end of the inner shaft. The Anti-Dust bushes (40, 47) protect the inner bearings from dust and abrasive solids which may be present in the Reactor.

The inner shaft is drilled with a vertical through central hole (46). An advantageous feature of the present invention is that this arrangement ensures that pressure balancing occurs, i.e., vessel pressure is transmitted up to the shroud, and also that the inner bearings will have uniform pressure on all sides. It may be noted that the Anti-Dust Bushes (40, 47) are permeable to vapour flow.

The magnetic seal terminates at the coupling of the inner shaft. At this point, the Driven Shaft (45), which is a part of the Reactor, is bolted to the inner shaft (34). When the inner shaft (34) rotates due to magnetic torque transmission, the driven shaft (45), which is bolted to the inner shaft by means of a coupling, also rotates, thus transmitting power to the agitator.

Some advantageous safety features associated with the present invention are described. The static shroud (2) is constructed from corrosion resistant material such as stainless steel, or high alloy steels. The static shroud (2) is the main pressure retaining component of the Magnetic seal. If, for any reason the static shroud (2) is breached, there will be a leakage path for the vessel/reactor fluids. A leak detection port (48) is provided at the upper end of the stool, usually in conjunction with the oil drain valve (49). This leak detection port can be connected to a vent line. For sensing potential leakage of hazardous process fluids, a chamber fitted with a sensor can be installed between the leak detection port and the vent line.

Operation of the MSA:

The cylindrical stool assembly sits on a mounting flange (1), which, in turn, is bolted onto a reactor vessel. The upper surface of the stool assembly has suitable steps and tapped holes to accommodate a vertical prime mover (D) with a downward shaft. A driver coupling (21) is located at the upper flange of the stool assembly, by means of an outer bearing. A central hole/recess in the top of the driver coupling (21) accepts the prime mover shaft.

The outer magnet assembly is attached at the lower end of the driver coupling (21), and rotates along with it. A shroud hermetically seals the reactor/pressure vessel. Torque is transmitted in a contact-free manner across the shroud, from the outer magnet assembly to the inner magnet assembly, which is attached to the inner shaft. A pair of inner bearings located in a cooled bearing housing (4) holds the inner shaft. An anti dust bush (40) between the inner shaft and bearing housing (4) prevents dust and heat from reaching the bearings, inner magnets and shroud. As an advantageous feature of the invention, the inner shaft is hollow above the anti-dust bush (40), so that vessel pressure is transmitted up to the shroud, and inner bearings face equal pressure from all sides.

When the motor/prime mover (D) rotates, torque is transmitted in a contact-free way to the inner shaft, which rotates in a synchronous manner.

It will be apparent from the above description that the present invention has the following key features. It:

a) Leaves little or no. wear and tear on inner and outer shafts as both shafts are supported/located by bearings that have rolling elements, that precludes rubbing action between the shafts and bearings b) Saves power through minimizing friction between moving parts, as bearings with rolling elements have lower friction as compared with sleeve bearings c) Eliminates, unlike in case of mechanical seals of the prior art, necessity of using sealing fluids that could potentially leak, into the reactor in case of the failure of the seal-face.

d) Provides a non-contact method of sealing, resulting in long life and trouble-free operation. This is achieved as there is no physical contact between the outer and inner shafts, hence no rubbing. This results in further reduction in wear and tear consequently prolonging life of the seal e) Ensures safe sealing of vessel fluids at high pressures and temperatures. Magnetic seals can only leak if a stationary component such as static shroud fails. Unlike the mechanical seals that often fail when a rotating component such as seal face or an O-ring fails, failure of components such as the static shroud is highly unlikely due to the sturdy design of these components.

f) Ensures safe sealing in case of applications requiring use of corrosive gases such as Chlorine, Bromine etc. This is for same reasons as in item (e) above.

g) Ensures safe sealing of hazardous, toxic or flammable fluids. This is for same reasons as in item (e) above.

h) Provides a shaft that suspends inside the agitator by a cantilever arrangement i) Can be used on industrial scale where mixing volumes are large which require large torque and where the shaft diameters can be suitably high. This is because the seal design permits heavy and large diameter shafts due to the inventive bearing design. Other magnetic designs can only be used with small and light shaft-impeller assemblies.

In view of the detailed foregoing description of the present invention, it will be apparent to a person skilled in the art that the present invention basically comprises the following items:

1. A magnetic seal assembly comprising:
   (a) an annular mounting flange (1) that is bolted onto a nozzle flange (A) fitted on a reactor vessel (B),
   (b) a static shroud (2),
   (c) a stool assembly,
   (d) an outer magnet assembly,
   (e) an inner magnet assembly,
   (f) a driver coupling (21),
   (g) a bearing housing (4),
   (h) upper and lower inner bearings (35, 36), and
   (i) upper and lower outer bearings (22, 26),
   wherein said annular mounting flange (1) is coaxially, sealably and fixedly connected to a shroud flange (13) of said static shroud (2), to a lower stool flange (3) of said stool assembly and to a nozzle flange (A) of a vessel (B);
   wherein the lower end of driver coupling (21) is coaxially, sealably and fixedly connected to the upper part of an outer magnet holder (17) of said outer magnet assembly;
   wherein said driver coupling (21) accommodates coaxially in its central bore a prime mover shaft of a prime mover (D) having a first keyway for coupling together said driver coupling (21) and said prime mover shaft;
   wherein said driver coupling (21) is coaxially, sealably, and rotatably connected to said stool assembly through said upper outer bearing (22);
   wherein said outer magnet assembly is coaxially, sealably and rotatably connected to said stool assembly through said lower outer bearing (26);
   wherein said inner magnet assembly is coaxially, sealably and fixedly connected through a second keyway to an inner shaft with coupling (34) wherein said inner shaft with coupling (34) is partly accommodated coaxially in the central bore of the inner core (33) of said inner magnet assembly, said inner core (33) having a coaxial central stepped hole, wherein said second keyway fits inside slot of the lower smaller diameter part of said stepped hole;
   wherein said inner shaft with coupling (34) is coaxially, sealably and rotatably disposed in the hollow cylinder of said bearing housing (4) through said upper and lower inner bearing (35, 36);
   wherein a prime mover mounting-flange of said prime mover (D) is coaxially and fixedly mounted on an upper stool flange (28) of said stool assembly.

2. A magnetic seal assembly as described in Item 1 wherein,
   a. the upper surface of said mounting flange (1) has a plurality of grooves for fitment of O-rings, comprising an inner O-ring and an outer O-ring, and steps are provided on said upper face of said mounting flange (1); the inside bore in the mounting flange (1) is fitted with a bearing housing (4), wherein inner bearings that further comprise upper inner bearings (35) and lower inner bearings (36) are fitted at either end of said bearing housing (4); the inner bearings being made from inert materials, and being either self-lubricated, or non-lubricated (dry running), or being sealed with inert lubricants,
   b. said static shroud (2) further comprises a shroud shell (12) that has a shroud flange (13) at its lower end and a shroud cap (14) at its upper end, said shroud flange (13) having drilled bolt holes wherein a plurality of shroud bolts are fitted therein to fixedly connect said shroud flange (13) to said mounting flange (1), an inner O-ring that is placed in the inner O-ring groove of said mounting flange (1); wherein said shroud flange (13) has a step at its lower face at its bolt-circle diameter,
   c. said outer magnet assembly further comprises a outer magnet holder (17), a plurality of outer magnets (18), an outer upper washer and an outer lower washer, said outer magnet holder (17) comprising a hollow cylinder with axial slots machined into its inner cylindrical surface, said axial slots being fitted with outer magnets (18) having their north-south poles orientated along their faces, that is they are magnetized along their thickness, said outer magnets (18) being attached to said outer magnet holder (17) by magnetic attraction; and as further safety, said outer magnets (18) being fixed into the axial slots with special adhesives; wherein a lower outer bearing (26) is fitted on the outer cylindrical surface of said outer magnet holder (17), wherein the outer races of said lower outer bearing (26) are fitted into a suitable recess in the stool shell (27), wherein said outer magnet holder (17) has tapped holes at its lower end, and a lower outer washer (19) is fitted to the lower end of said outer magnet holder (17) with screws through said tapped holes; wherein at the upper end of said outer magnet holder (17) its inner cylindrical portion is fitted with an upper outer washer (20); and wherein said outer magnet holder (17) has tapped holes on its upper surface, where a driver coupling (21) is fitted;
   d. said driver coupling (21) connects said outer magnet assembly to said prime mover (D), wherein said driver coupling (21) has angled holes (11) that radially fan outwards, said angled holes further being oriented tangentially outwards, and wherein said driver coupling (21) has vent holes on its upper surface, said upper surface of said driver coupling (21) is machined inside and outside, and is fitted with an upper outer beating (22); wherein
      said upper outer bearing (22) and said lower outer bearing (26) align said outer magnet assembly coaxially to said static shroud (2), ensuring that there is a uniform gap between said outer magnets (18) and said shroud; the inner part of said driver coupling (21) is bored to accommodate said prime mover shaft with said first keyway, and the machined upper end of said driver coupling (21) is partly threaded to fit an outer lock nut (23) and an outer lock washer (24), which locks said upper outer bearing (22) in place;
   e. said outer magnet assembly and said driver coupling (21) are disposed inside said stool assembly that has connections for filling lubricant or coolant, and overflow and draining thereof, wherein said stool assembly comprises a stool shell (27) having fitted at its either end, a lower stool flange (3), an upper stool flange (28), and an optional stool jacket (29), wherein said lower stool flange (3) sits on said mounting flange (1), and is located in its place by a step in said mounting flange (1), said lower stool flange (3) being bolted to said mounting flange (1) with an outer O-ring (41) thereby ensuring leak proof sealing between said lower stool flange (3) and said mounting flange (1);
      wherein said stool shell (27) is filled with lubricating fluid or a cooling fluid, said lower stool flange (3) having a connection for filling the lubricating fluid or the cooling fluid that is supplied from respective reservoirs (42), and wherein the lubricant or the cooling fluid is filled till it overflows out of the overflow valve (50), which is then closed, wherein said outer magnet assembly is immersed in said lubricating or said cooling fluid; wherein an optional stool jacket (29) surrounds said stool shell (27), and cooling water or any other suitable coolant is circulated through said stool jacket (29) that has a jacket inlet connection (10a) and a jacket outlet connection (10b) at its lower and upper ends, respectively;

f. said upper stool flange (28) has a recess and a plurality of tapped holes in its upper face to accommodate the flange mounted prime mover (D), inner diameter of said upper stool flange (28) being machined to accommodate said upper outer bearing (22), the outer races whereof fit into said upper stool flange (28), and the inner races whereof sit on a suitably machined part at the upper end of said driver coupling (21) thereby coaxially locating said driver coupling (21) and said outer magnet assembly with said static shroud (2), g. said inner magnet assembly comprises an inner magnet holder (30), a plurality of inner magnets, an inner sleeve (32), and an inner core (33), wherein said inner magnet holder (30) is of a hollow cylindrical shape and made out of soft-iron, where the outer surface of said inner magnet holder (30) is machined into a polygonal surface, such that the number of sides in the polygon equals the number of said inner magnets in the assembly and wherein said inner magnets are attached to each side of said polygonal surface;

wherein said inner magnet holder (30) is welded onto a non-magnetic inner core (33) which is a stepped hollow non-magnetic cylindrical part, the step being provided to facilitate secure positioning of an inner washer (43); whereby said inner magnet holder (30) with attached said inner magnets slides onto said inner core (33); and wherein said inner sleeve (32) which is preferably made of corrosion resistant material fits over said inner magnets, and is welded to said inner core (33) at either end thereof, whereby said inner magnets are not in contact with fluid in said reactor vessel, h. said inner core (33) has a stepped hole at its axis to accommodate said inner shaft with coupling (34), wherein the diameter at the upper end of said stepped hole is greater than the diameter at its lower end and wherein said hole at said lower end is slotted to fit said second keyway, thereby ensuring that said inner shaft with coupling (34) securely rotates along with said inner core (33);

i. wherein said inner shaft with coupling (34) passes through a central bore in said inner core (33), the upper end of said shaft having a tapped hole, wherein an inner washer (43) that is placed on the step of said inner core (33) holes and has an inner shaft lock bolt, said bolt being tightened into said tapped hole thereby coaxially locating said inner shaft with coupling (34) with respect to said inner core (33);

j. said inner shaft with coupling (34) has a threaded portion in and above the upper inner bearing, thereby accommodating an inner lock nut and an inner lock washer, and holds down the upper inner bearing (35) using a bearing lock that is bolted to said mounting flange (1) with a plurality of bolts;

k. said bearing housing (4) is extended so that a pair of anti-dust bushes are fitted, wherein a lower anti-dust bush (40) is fitted between said inner shaft (34) and said bearing housing (4), and an upper ant-dust bush (47) is fitted at the upper end of the inner shaft; the anti-dust bushes (40, and 47) being a hollow cylinder made of material selected from a group comprising graphite, PTFE, PEEK, or other suitable material thereby preventing dust or solid particles from entering the area of said inner bearings or said shroud and forming a barrier for hot vessel vapors from coming into direct contact with inner bearings and inner magnets;

l. said inner shaft (34) is drilled with a horizontal hole above the location of said anti-dust bush (40), and a vertical hole extending from said horizontal hole to the top of said inner shaft (34) thereby ensuring that pressure balancing occurs, and the vessel pressure is transmitted up to said shroud, and also that said inner bearings have uniform pressure on all sides;

and wherein in said magnetic seal assembly, said stool assembly sits on said mounting flange (1), which, in turn, is bolted onto said reactor vessel, wherein said upper surface of said stool assembly has suitable steps and tapped holes to accommodate a vertical said prime mover (D) with a downward shaft and wherein said driver coupling (21) is located at said upper flange of said stool assembly, by means of said outer bearing and wherein a central hole in the top of the driver coupling (21) accepts said prime mover shaft;

said outer magnet assembly is attached at the lower end of said driver coupling (21), and rotates along with it; said shroud hermetically sealing said reactor vessel; torque being transmitted in a contact-free manner across the shroud, from the outer magnet assembly to said inner magnet assembly, which is in turn attached to said inner shaft (34).

3. A magnetic seal assembly as described in any of items 1 or 2 which further comprises a leak detection port (48) that is provided at the upper end of said stool assembly and an oil drain valve (49) that is located at the outer diameter of said stool flange or said mounting flange.

While the above description contains many specificities, these should not be construed as limitation in the scope of the invention, but rather as an exemplification of the preferred embodiments thereof. Many other variations are possible. Accordingly, the scope of the invention should be determined not by the embodiments illustrated, but by the appended claims and their legal equivalents.

The invention claimed is:

1. A magnetic seal assembly comprising:
(a) an annular mounting flange that is bolted onto a nozzle flange fitted on a reactor vessel,
(b) a static shroud,
(c) a stool assembly that comprises a shell, an upper stool flange, and a lower stool flange,
(d) an outer magnet assembly that comprises an outer magnet holder and at least one outer magnet,
(e) an inner magnet assembly that comprises an inner magnet holder, an inner core, and at least one inner magnet,
(f) a driver coupling that has a central core,
(g) a bearing housing that has a hollow cylinder,
(h) upper and lower inner bearings, and
(i) upper and lower outer bearings, wherein said annular mounting flange is coaxially, sealably and fixedly connected to a shroud flange of said static shroud, to the lower stool flange of said stool assembly and to the nozzle flange of the vessel;

wherein a lower end of the driver coupling is coaxially, sealably and fixedly connected to an upper part of the outer magnet holder of said outer magnet assembly;

wherein said driver coupling accommodates coaxially in its central bore a prime mover shaft of a prime mover having a first keyway for coupling together said driver coupling and said prime mover shaft;

wherein said driver coupling is coaxially, sealably, and rotatably connected to said stool assembly through said upper outer bearing;

wherein said outer magnet assembly is coaxially, sealably and rotatably connected to said stool assembly through said lower outer bearing;

wherein said inner magnet assembly is coaxially, sealably and fixedly connected through a second keyway to an inner shaft with a coupling wherein said inner shaft with the coupling is partly accommodated coaxially in a central bore of the inner core of said inner magnet assembly, said inner core having a coaxial central stepped hole, wherein said second keyway fits inside a slot of a lower smaller diameter part of said stepped hole;

wherein said inner shaft with the coupling is coaxially, sealably and rotatably disposed in the hollow cylinder of said bearing housing through said upper and lower inner bearing; and wherein a prime mover mounting-flange of said prime mover is coaxially and fixedly mounted on the upper stool flange of said stool assembly.

2. A magnetic seal assembly as claimed in claim 1 wherein,     a. the upper surface of said mounting flange has a plurality of grooves for fitment of O-rings, comprising an inner O-ring and an outer O-ring, and steps are provided on said upper face of said mounting flange; the inside bore in the mounting flange is fitted with the bearing housing, wherein inner bearings that further comprise the upper inner bearings and the lower inner bearings are fitted at either end of said bearing housing;

said inner bearings being made from inert materials, and are either self-lubricated, or non-lubricated, or are sealed with inert lubricants,     b. said static shroud further comprises a shroud shell that has a shroud flange at its lower end and a shroud cap at its upper end,     said shroud flange having drilled bolt holes wherein a plurality of shroud bolts are fitted therein to fixedly connect said shroud flange to said mounting flange and an inner O-ring that is placed in the inner O-ring groove of said mounting flange; wherein said shroud flange has a step at its lower face at its bolt-circle diameter,     c. said outer magnet assembly comprises a plurality of outer magnets and further comprises an outer upper washer and an outer lower washer, said outer magnet holder comprising a hollow cylinder with axial slots machined into its inner cylindrical surface, said axial slots being fitted with outer magnets having their north-south poles orientated along their faces, that is they are magnetized along their thickness, said outer magnets being attached to said outer magnet holder by magnetic attraction; and as further safety, said outer magnets being fixed into the axial slots with special adhesives; wherein a lower outer bearing is fitted on the outer cylindrical surface of said outer magnet holder, wherein the outer races of said lower outer bearing are fitted into a suitable recess in the stool shell, wherein said outer magnet holder has tapped holes at its lower end, and a lower outer washer is fitted to the lower end of said outer magnet holder with screws through said tapped holes; wherein at the upper end of said outer magnet holder its inner cylindrical portion is fitted with an upper outer washer; and wherein said outer magnet holder has tapped holes on its upper surface, where a driver coupling is fitted;

d. said driver coupling connects said outer magnet assembly to said prime mover, wherein said driver coupling has angled holes that radially fan outwards, said angled holes further being oriented tangentially outwards, and wherein said driver coupling has vent holes on its upper surface, said upper surface of said driver coupling is machined inside and outside, and is fitted with the upper outer bearing; wherein     e. said upper outer bearing and said lower outer bearing align said outer magnet assembly coaxially to said static shroud, ensuring that there is a uniform gap between said outer magnets and said shroud; the inner part of said driver coupling is bored to accommodate said prime mover shaft with said first keyway, and the machined upper end of said driver coupling is partly threaded to fit an outer lock nut and an outer lock washer, which locks said upper outer bearing in place;

said outer magnet assembly and said driver coupling are disposed inside said stool assembly that has connections for filling lubricant or coolant, and overflow and draining thereof, wherein said lower stool flange sits on said mounting flange, and is located in its place by a step in said mounting flange, said lower stool flange being bolted to said mounting flange with an outer O-ring thereby ensuring leak proof sealing between said lower stool flange and said mounting flange;

wherein said stool shell is filled with lubricating fluid or a cooling fluid, said lower stool flange has a connection for filling the lubricating fluid or the cooling fluid that is supplied from respective oil reservoirs, and wherein the lubricant or the cooling fluid is filled till it overflows out of the oil overflow valve, which is then closed;

wherein said outer magnet assembly is also immersed in said lubricating or said cooling fluid; wherein a stool jacket surrounds said stool shell, and cooling water or any other suitable coolant is circulated through said stool jacket that has a jacket inlet connection and a jacket outlet connection at its lower and upper ends, respectively;

f. said upper stool flange has a recess and a plurality of tapped holes in its upper face to accommodate the flange mounted prime mover, the inner diameter of said upper stool flange being machined to accommodate said upper outer bearing, outer races of the upper outer bearing fit into said upper stool flange, and the inner races of the upper outer bearing sit on a suitably machined part at the upper end of said driver coupling thereby coaxially locating said driver coupling and said outer magnet assembly with said static shroud,     g. said inner magnet assembly comprises a plurality of inner magnets and an inner sleeve,     wherein said inner magnet holder is of a hollow cylindrical shape and made out of soft-iron, where the outer surface of said inner magnet holder is machined into a polygonal surface, such that the number of sides in the polygon equals the number of said inner magnets in the assembly and wherein said inner magnets are attached to each side of said polygonal surface;

wherein said inner magnet holder is welded onto a non-magnetic inner core which is a stepped hollow non-magnetic cylindrical part, the step being provided to facilitate secure positioning of an inner washer; whereby said inner magnet holder with attached said inner magnets slides onto said inner core; and wherein said inner sleeve fits over said inner magnets, and is welded to said inner core at either end thereof, whereby said inner magnets are not in contact with fluid in said reactor vessel, h. said inner core has a stepped hole at its axis to accommodate said inner shaft with coupling, wherein the diameter at the upper end of said stepped hole is greater than the diameter at its lower end and wherein said hole at said lower end is slotted to fit said second keyway, thereby ensuring that said inner shaft with coupling securely rotates along with said inner core;

i. wherein said inner shaft with coupling passes through a central bore in said inner core, the upper end of said shaft having a tapped hole, wherein an inner washer that is placed on the step of said inner core holes and has an inner shaft lock bolt, said bolt being tightened into said tapped hole thereby coaxially locating said inner shaft with coupling with respect to said inner core;

j. said inner shaft has a threaded portion in and above the upper inner bearing, thereby accommodating an inner lock nut and an inner lock washer, and holds down the upper inner bearing using a bearing lock that is bolted to said mounting flange with a plurality of bolts;

k. said bearing housing is extended so that a pair of anti-dust bushes are fitted, wherein a lower anti-dust bush is fitted between said inner shaft and said bearing housing, and an upper anti-dust bush is fitted at the upper end of the inner shaft; the anti-dust bushes being a hollow cylinder made of material selected from a group comprising graphite, PTFE, PEEK, or other suitable material thereby preventing dust or solid particles from entering the area of said inner bearings or said shroud and forming a barrier for hot vessel vapors from coming into direct contact with inner bearings and inner magnets;

l. said inner shaft is drilled with a horizontal hole above the location of said anti-dust bush, and a vertical hole extending from said horizontal hole to the top of said inner shaft thereby ensuring that pressure balancing occurs, and the vessel pressure is transmitted up to said shroud, and also that said inner bearings have uniform pressure on all sides; and wherein in said magnetic seal assembly, said stool assembly sits on said mounting flange, which, in turn, is bolted onto said reactor vessel, wherein said upper surface of said stool assembly has suitable steps and tapped holes to accommodate said prime mover with a downward shaft and wherein said driver coupling is located at said upper flange of said stool assembly, by means of said outer bearing and wherein a central hole in the top of the driver coupling accepts said prime mover shaft;

said outer magnet assembly is attached at the lower end of said driver coupling, and rotates along with it; said shroud hermetically sealing said reactor vessel; torque being transmitted in a contact-free manner across the shroud, from the outer magnet assembly to said inner magnet assembly, which is in turn attached to said inner shaft.

3. A magnetic seal assembly as described in claim 1 which further comprises a leak detection port that is provided at the upper cud of said stool assembly and an oil drain valve that is located at the outer diameter of said stool flange or said mounting flange.

4. A magnetic seal assembly as described in claim 2, which further comprises a leak detection port that is provided at the upper end of said stool assembly and an oil drain valve that is located at the outer diameter of said stool flange or said mounting flange.

5. A magnetic seal assembly as described in claim 1, in which the inner sleeve is made of corrosion-resistant material.

* * * * *